United States Patent [19]

Kurita et al.

[11] Patent Number: 5,158,988

[45] Date of Patent: Oct. 27, 1992

[54] PHOTO-CURABLE SILICONE COMPOSITIONS AND ADHESIVE SILICONE COMPOSITIONS

[75] Inventors: Atsushi Kurita; Nobuyuki Nishiwaki; Shigeki Matsushita; Kohei Hamanishi, all of Tokyo, Japan

[73] Assignee: Toshiba Silicone Co., Ltd., Tokyo, Japan

[21] Appl. No.: 798,167

[22] Filed: Nov. 26, 1991

[30] Foreign Application Priority Data

Nov. 27, 1990 [JP] Japan ................................ 2-320843

[51] Int. Cl.$^5$ ...................... C08G 77/20; C08G 77/22; C08F 2/50
[52] U.S. Cl. ........................................ 522/64; 522/99; 528/30; 528/32
[58] Field of Search ...................... 522/64, 99; 528/32, 528/30

[56] References Cited

U.S. PATENT DOCUMENTS

| | | | |
|---|---|---|---|
| 3,700,574 | 10/1972 | Kehr | 522/64 |
| 4,265,723 | 5/1981 | Hesse et al. | 522/64 |
| 4,889,905 | 12/1989 | Suzuki | 522/99 |
| 4,935,455 | 6/1990 | Huy et al. | 522/83 |
| 4,946,874 | 8/1990 | Lee et al. | 522/99 |

FOREIGN PATENT DOCUMENTS 364389 3/1991 Japan .

*Primary Examiner*—Marion E. McCamish
*Assistant Examiner*—Susan Berman
*Attorney, Agent, or Firm*—Sughrue, Mion, Zinn, Macpeak & Seas

[57] ABSTRACT

Disclosed is a curable silicone composition comprising: (A) an organopolysiloxane having a silicon-bonded unsaturated aliphatic radical; (B) an organopolysiloxane having a silicon-bonded mercaptoalkyl radical; and (C) a photoreaction-initiating amount of photoreaction initiator. The photoreaction initiator includes arylcarbonyl phosphine oxide compounds, having a radical selected from the group consisting of substituted and unsubstituted aryl radicals, and another two radicals selected from the group consisting of substituted and unsubstituted monovalent hydrocarbon radicals. The above silicone, composition is efficiently cured by visible light radiation and usable for photo-curable adhesives.

16 Claims, No Drawings

PHOTO-CURABLE SILICONE COMPOSITIONS AND ADHESIVE SILICONE COMPOSITIONS

BACKGROUND OF THE INVENTION

1. Field of the Invention

The present invention relates to a photo-curable silicone composition which is hardened by being subjected to visible light radiation, and more particularly to a photo-curable silicone composition and an adhesive composition having prominent properties such as resistance to heat, cold and climatic conditions which are peculiar to silicone rubber, and which are set by means of visible light radiation, thereby contributing to the improvement of productivity and energy savings at the photo-setting step, accordingly.

2. Description of the Prior Art

Photo-curable silicone materials, in general, are advantageous in having being resistant to heat and humidity, have excellent electrical properties in comparison with other organic materials, and can be controlled to form various states such as gels, rubbers and resins. Therefore, they are widely utilized in a variety of commercial applications, for example, as coating and covering materials and adhesives for plastic substrates of low heat-resistance and for heat-sensitive electric and electronic parts. For this reason, numerous photo-curable silicone compositions and photo-curable silicone adhesives are suggested for the purpose of improving productivity and saving energy.

For example, U.S. Pat. No. 3,726,710 by Berger et al. discloses silicone compositions comprising a vinyl-radical-containing organopolysiloxane compound and various photoreaction initiators, which are set by means of high intensity ultraviolet light radiation. These silicone compositions, however, can be cured only by ultraviolet light having a wavelength shorter than 300 nm, and they cannot be cured, accordingly, by radiation having a wavelength longer than 300 nm. Therefore, these silicone compositions have a defect in that, in curing, the utilization of light energy is low, thus requiring the photo-setting machine to be used at high power.

As another prior art reference, U.S. Pat. No. 3,816,282 by Viventi discloses silicone compositions comprising a mercapto-radical-containing organopolysiloxane, polymethylvinylsiloxane and various organic peroxides. However, these silicone compositions must also be cured by radiation only in the ultraviolet range. Consequently, these silicone compositions have the same defect as described above.

In addition to the two U.S. patents above, U.S. Pat. No. 4,364,809 by Satoh et al. discloses a silicone composition comprising a vinyl-radical-containing organopolysiloxane and an organic peroxide. However, this silicone composition also cannot be cured by radiation outside the ultraviolet range, and thereby gives rise to the same defect found for the silicone compositions described above.

U.S. Pat. No. 4,908,395 by the applicant of the present invention suggests a silicone composition comprising a vinyl-radical-containing organopolysiloxane, an aromatic ketone photo-reaction initiator and a trialkenyl isocyanurate. However, as was found for the above compositions, this silicone composition cannot be cured by any radiation lying outside the ultraviolet range, and therefore has the same defect inherent in the compositions described above.

SUMMARY OF THE INVENTION

It is, therefore, an object of the present invention to provide a silicone composition and a silicone adhesive composition which can be cured by short-term exposure to visible light radiation.

In accordance with the present invention, there is provided a curable silicone composition comprising: (A) an organopolysiloxane having a silicon-bonded unsaturated aliphatic radical; (B) an organopolysiloxane having a silicon-bonded mercaptoalkyl radical; and (C) a photoreaction-initiating amount of photoreaction initiator. The photoreaction initiator includes arylcarbonyl phosphine oxide compounds, having a radical selected from the group consisting of substituted and unsubstituted aryl radicals, and another two radicals selected from the group consisting of substituted and unsubstituted monovalent hydrocarbon radicals.

The photo-curable silicone composition of the present invention can be cured easily by visible light radiation, thus resulting in energy savings and increased productivity. The photo-curable composition also retains prominent properties such as resistance to heat, cold and climatic conditions which are peculiar to silicone compounds. Therefore it is particularly suitable for coating and covering materials and adhesives for electric and electronic parts and the like.

DETAILED DESCRIPTION OF THE PREFERRED EMBODIMENTS

The silicone composition of the present invention is based on research by the present inventors, in which it was found that a silicone composition including an organopolysiloxane having a silicon-bonded unsaturated aliphatic radical, an organopolysiloxane having a silicon-bonded mercaptoalkyl radical, and an arylcarbonyl phosphine oxide compound can be cured by short-term exposure to visible light radiation. In addition, after a silicone composition further including a hydrolyzable-radical-containing silicon compound was cured it was found to exhibit large bond strength and improved shrink-resistance, humidity resistance and heat resistance.

Now, the property and compositional constituents of the photo-curable silicone composition according to the present invention will be described.

First, the photo-curable silicone composition of the present invention comprises an organopolysiloxane (A) having a silicon-bonded unsaturated aliphatic radical. In the organopolysiloxane compound, the silicon-bonded unsaturated aliphatic radical may include a variety of olefinic and acetylenic radicals, for instance, vinyl, propenyl, butenyl, hexenyl, cyclohexenyl, cyclooctenyl, cyclohexenylethyl, cyclooctenylethyl, ethynyl, propynyl, butynyl and hexynyl. Among the specific radicals that may be mentioned, there are, for example, alkenyl radicals such as vinyl, allyl, 3-butenyl, 5-hexenyl and the like; cycloalkenyl radicals such as 2-cyclohexenyl, 2-cyclooctenyl, 2-(2-cyclohexenyl)ethyl, 2-(2-cyclooctenyl)ethyl and the like; and alkynyl radicals such as ethynyl, 2-propynyl, 3-butynyl, 5-hexynyl and the like. Here, it is to be noted that, in the above silicon-bonded unsaturated aliphatic radicals, alkenyl radicals having an unsaturated bond at the end of the group are preferable, because of the reactivity of the unsaturated bond and the like. Moreover, considering the availability of raw materials and the preparation ease of the organopolysiloxane (A) by ordinary synthetic methods, a vinyl radical is most suitable for the silicon-bonded unsaturated aliphatic radicals. The number of unsaturated aliphatic radicals bonded to the silicon atoms is preferably within a range of about 0.01 to about 50% relative to the total number of organic radicals included in the organopolysiloxane (A), for reasons of crosslinking efficiency in the silicone composition and heat resistance of the obtained photo-cured composition. In regard to the other silicon-bonded organic radicals in the organopolysiloxane (A), illustrative examples are, for example, alkyl radicals such as methyl, ethyl, propyl and the like; aryl radicals such as phenyl, o-tolyl, m-tolyl, p-tolyl, 2,4-xylyl and the like; aralkyl radicals such as 2-phenylethyl, 2-phenylpropyl and the like; and substituted hydrocarbon radicals such as chloromethyl, o-chlorophenyl, 3,3,3-trifluoropropyl and the like. Here, considering the preparation ease of the organopolysiloxane (A) and the heat resistance of the obtained photo-cured composition, suitable radicals are methyl and phenyl radicals.

The above-mentioned organopolysiloxane (A) may have any linear-chain, cyclic or branched structure. Of course, it is to be noted that the organopolysiloxane (A) can be a simple material or a mixture of two or more kinds of organopolysiloxane, such as those described above. Moreover, the organopolysiloxane may contain a hydroxyl radical or alkoxy radicals such as methoxy, ethoxy and the like. Preferably, an organopolysiloxane having a viscosity within a range of about 50 to 500,000 centipoises can be used in the present invention.

Second, the photo-curable silicone composition of the present invention comprises an organopolysiloxane (B) having a silicon-bonded mercaptoalkyl radical. Among the specific mercaptoalkyl radicals that may be mentioned, there are, for example, mercaptomethyl, 2-mercaptoethyl, 3-mercaptopropyl, 4-mercaptobutyl and the like. In these examples, a 3-mercaptopropyl radical is preferred in view of the availability of raw materials and the preparation ease of the organopolysiloxane. In regard to the other silicon-bonded organic radicals of the organopolysiloxane (B) having a mercaptoalkyl radical, illustrative examples are, for example, alkyl radicals such as methyl, ethyl, propyl and the like; cycloalkyl radicals such as cyclohexyl and the like; aryl radicals such as phenyl, o-tolyl, m-tolyl, p-tolyl, 2,4-xylyl and the like; aralkyl radicals such as 2-phenylethyl, 2-phenylpropyl and the like; and substituted hydrocarbon radicals such as chloromethyl, o-chlorophenyl, 3,3,3-trifluoropropyl and the like. Here, it is to be noted that a methyl radical and a phenyl radical are preferred considering the preparation ease of the organopolysiloxane (B) by ordinary synthetic methods and the heat resistance of the obtained photo-cured composition.

The above-mentioned organopolysiloxane (B) may have any linear-chain, cyclic or branched structure. Moreover, it is to be noted that the organopolysiloxane (B) can be a simple material or a mixture of two or more kinds of organopolysiloxane, such as described above. In addition, the organopolysiloxane may contain a hydroxyl radical or alkoxy radicals such as methoxy, ethoxy and the like.

In the above organopolysiloxane (B), the number of mercaptoalkyl radicals bonded to the silicon atoms is preferably within a range of about 1 to about 50% relative to the total number of organic radicals included in the organopolysiloxane (B), for reasons of crosslinking efficiency in the silicone composition and properties of the obtained photo-cured composition product.

The amount of organopolysiloxane (B) is preferably within a range of about 1 to about 200 parts by weight relative to 100 parts by weight of organopolysiloxane (A). When the amount of organopolysiloxane (B) is less than 1 part by weight, the hardenability of the silicone composition is rather poor, and if it exceeds 200 parts by weight, the composition's heat resistance deteriorates.

The ingredient (C), one of the characteristic components of the photo-curable silicone composition according to the present invention, works as a photoreaction initiator and is generally represented by the formula:

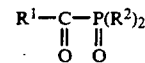

wherein $R^1$ is selected from the group consisting of substituted and unsubstituted aryl radicals, and each $R^2$ is individually selected from the group consisting of substituted and unsubstituted monovalent hydrocarbon radicals. The ingredient (C) crosslinks the organopolysiloxane (A) and organopolysiloxane (B) efficiently upon exposure to visible light radiation. Among more specific substituted and unsubstituted aryl radicals ($R^1$), there are substituted and unsubstituted phenyl radicals such as phenyl, o-tolyl, m-tolyl, p-tolyl, 2,4,6-trimethylphenyl, 4-isopropylphenyl, o-chlorophenyl, m-chlorophenyl, p-chlorophenyl and the like. In these radicals, phenyl, o-tolyl, m-tolyl, p-tolyl, 2,4,6-trimethylphenyl and 4-isopropylphenyl are suitable for the radical $R^1$ in view of the preparation ease of the ingredient (C) by ordinary synthetic methods. Moreover, cosidering photo-crosslinking efficiency, an ingredient containing a 2,4,6-trimethylphenyl radical for the radical $R^1$ is more suitable.

The substituted and unsubstituted aryl radicals may also include substituted and unsubstituted naphthyl radicals such as naphthyl, 4-chloro-2-naphthyl and the like. However, these naphthyl-radical-containing ingredients (C) are inferior to those having a phenyl radical in terms of photo-crosslinking efficiency and preparation ease of the ingredient (C).

Illustrative examples of substituted and unsubstituted monovalent hydrocarbon radicals ($R^2$) are, for example, alkyl radicals such as methyl, ethyl, propyl and the like; cycloalkyl radicals such as cyclohexyl and the like; aryl radicals such as phenyl, o-tolyl, 2,4-xylyl and the like; aralkyl radicals such as 2-phenylethyl, 2-phenylpropyl and the like; and substituted hydrocarbon radicals such as chloromethyl, o-chlorophenyl, 3,3,3-trifluoropropyl and the like. Here, it is to be noted that a phenyl radical is suitable considering the preparation ease of the organopolysiloxane (B) by ordinary synthetic methods and the photo-crosslinking efficiency of the obtained photo-curable silicone composition.

The amount of ingredient (C) is preferably within a range of about 0.05 to about 50 parts by weight relative to 100 parts by weight of organopolysiloxane (A). When the amount of ingredient (C) is less than 0.05 part by weight, the photoreaction initiating activity of ingredient (C) is insufficient. If the amount of ingredient (C) exceeds 50 parts by weight, the photoreaction initiating activity does not improve further despite any increase in the amount of the ingredient, and such excessive amounts will lead to a deterioriation in heat resistance of the photo-curable composition and increased shrinkage during curing.

In the present invention, it is preferable that the photo-curable composition also include another photoreaction initiating agent, in addition to ingredient (C), at an amount of about 0.01 to about 50 parts by weight relative to 100 parts by weight of organopolysiloxane (A) in order to further improve the photo-crosslinking efficiency of the silicone composition. Illustrative examples of an additional photoreaction initiator are aromatic hydrocarbon compounds, acetophenon and its derivatives, xanthone and its derivatives, thioxanthone and its derivatives, disulfide compounds, quinone compounds, halogenated hydrocarbons, amines, organic peroxides and the like. Among these compounds, substituted and unsubstituted benzoyl-radical-containing compounds are preferred for the additional initiator of the present invention because they are stable compounds that are compatible with silicone compounds. Illustrative examples of these preferred initiators are, for example, 2-hydroxy-2-methyl-1-phenylpropane-1-on, 2-hydroxy-2-methyl-1-(4-isopropylphenyl)propane-1-on, 1,1-diethoxyacetophenone, t-butyl perbenzoate and the like.

The amount of additional initiator is preferably within a range of about 0.01 to about 50 parts by weight relative to 100 parts by weight of organopolysiloxane (A) for improvement of photo-crosslinking efficiency of the silicone composition. When the amount of additional initiator is less than 0.01 part by weight, the photoreaction initiating activity of the ingredient (C) is poor. On the other hand, when the amount exceeds 50 parts by weight, the photoreaction initiating activity does not improve further despite the increase in the amount of ingredient, and such excessive amounts will lead to a deterioration in heat resistance of the photo-curable composition and increased shrinkage during curing.

Furthermore, the photo-curable composition according to the present invention may include, in addition, a silicon compound (D) having a hydrolyzable radical, which can impart better adherence to the photo-curable silicone composition of the present invention. Illustrative examples of the hydrolyzable radical of the additional ingredient (D) are, for example, alkoxy radicals such as methoxy, ethoxy, propoxy and the like; alkenyloxy radicals such as 2-propenyloxy and the like; aryloxy radicals such as phenoxy and the like; acyloxy radicals such as acetoxy and the like; dialkyl ketoximo radicals such as methyl ethyl ketoximo and the like; dialkylamino radicals such as diethylamino and the like; acylamino radicals such as acetylamino and the like; dialkylaminoxy radicals such as diethylaminoxy and the like; the halogenated and cyanogenated radicals which are obtained respectively by halogenation or cyanogenation of the above mentioned radicals; halogen atoms such as fluoro, chloro, bromo, and iodo; and a hydroxyl radical. The partially hydrolyzed radicals introduced from the above-mentioned radicals also can be used.

The silicon compound (D) may have other organic radicals besides the above-mentioned hydrolyzable radicals. Illustrative examples of those radicals are, for example, alkyl radicals such as methyl, ethyl, propyl and the like; cycloalkyl radicals such as cyclohexyl, cyclooctyl and the like; alkenyl radicals such as vinyl, allyl, 3-butenyl, 5-hexenyl and the like; cycloalkenyl radicals such as 2-cyclohexenyl, 2-cyclooctenyl and the like; substituted alkyl radicals such as 3-aminopropyl, 3-chloropropyl, 3,3,3-trifluoropropyl, 2-cyanoethyl, 3-glycidyloxypropyl, 3-acryloxypropyl, 3-methacryloxypropyl, mercaptomethyl, 3-mercaptopropyl, chloromethyl, N-(2-aminoethyl)-3-aminopropyl and the like; aryl radicals such as phenyl, o-tolyl, 2,4-xylyl, o-chlorophenyl and the like; aralkyl radicals such as 2-phenylethyl, 2-phenylpropyl and the like; and a hydrogen atom.

Among the above-mentioned hydrolyzable radicals, alkoxy radicals and a hydroxyl radical are suitable for stability of the compounds and adherence of the silicone composition. In regard to the remaining organic radicals, 3-aminopropyl radical, 3-mercaptopropyl radical, 3-methacryloxypropyl radical and vinyl radical are preferable because of their reliable adherence.

According to the above, illustrative examples of the preferred silicon compound (D) having a hydrolyzable radical are, for example, (3-aminopropyl)triethoxysilane, (3-aminopropyl)trimethoxysilane, (3-mercaptopropyl)trimethoxysilane, (3-mercaptopropyl)triethoxysilane, (3-methacryloxypropyl)trimethoxysilane, (3-methacryloxypropyl)triethoxysilane, vinyltrimethoxysilane, vinyltriethoxysilane, tetramethoxysilane, tetraethoxysilane, 3-(trimethoxysilyl)propyl diallyl isocyanurate, 3-(triethoxysilyl)propyl dially isocyanurate, bis(3-(trimethoxysilyl)propyl) allyl isocyanurate, bis(3-(triethoxysilyl)propyl) allyl isocyanurate, tris(3-trimethoxysilyl)propyl) isocyanurate, tris(3-(triethoxysilyl)-propyl) isocyanurate, and their partially hydrolyzed compounds. It is obvious that one or more silicon compound (D) can be employed in any combination.

On the other hand, hexamethyldisilazane, 1,1,3,3-tetramethyldisilazane and the like are also usable in place of the hydrolyzable-radical-containing silicon compound (D), because these disilazane compounds produce effects similar to those produced by the above-mentioned silicon compounds.

The amount of additional ingredient (D) is preferably within a range of about 0.1 to about 20 parts by weight relative to 100 parts by weight of organopolysiloxane (A). When the amount of additional ingredient (D) is less than 0.1 part by weight, the adhesiveness of the silicone composition is insufficient. On the other hand, when the amount exceeds 20 parts by weight, the hardenability and stability of the silicone composition decreases.

Moreover, the photo-curable composition according to the present invention may further include, as is needed, additives such as anti-gelling agents (dark reaction inhibitors), heat resistance improvers, fillers, colorants such as pigments or dyes, solvents and the like.

Illustrative examples of the suitable anti-gelling agents (dark reaction inhibitors) are, for example, hydroquinone, p-methoxyphenol, t-butylcatechol, phenothiazine and the like.

Preferred examples of heat resistance improvers are phenolic compounds used as anti-aging agents. Illustrative examples of phenolic compounds are monophenol compounds such as 2,6-di-t-butyl-p-cresol, 2-t-butyl-4-methoxyphenol, 3-t-butyl-4-methoxyphenol, 2,6-di-t-butyl-4-ethylphenol and the like; bisphenol compounds such as 2,2'-methylenebis(4-methyl-6-t-butylphenol), 4,4'-thiobis(3-methyl-6-t-butylphenol), 4,4'-butylidenebis(3-methyl-6-t-butylphenol) and the like; and high-molecular weight phenolic compounds such as 1,1,3-tris(2-methyl-4-hydroxy-5-t-butylphenyl)butane, 1,3,5-trimethyl-2,4,6-tris(3,5-di-t-butyl-4-hydoroxybenzyl)benzene, tetrakis[3-(3,5-di-t-butyl-4-hydroxyphenyl) propionate]methane, bis[3,3-bis(4-hydroxy-3-t-butylphenyl)butylic acid] glycol ester, tocopherol (vitamin E) and the like. Of course, the heat resistance improver is not restricted to those specifically named above.

Fillers are utilized for the purpose of improving the mechanical strength of the photo-cured silicone composition and for controlling fluidity of the admixture. Among specific fillers which can be suitably blended to the silicone composition of the present invention, there are fumed silica, precipitated silica, fused silica, quartz fine powder and the like. These fillers may be blended to meet any practical use requirements. The preferred amount of filler is equal to or less than about 300 parts by weight relative to 100 parts by weight of organopolysiloxane (A). If the filler amount is over 300 parts by weight, the mechanical strength of the cured silicone composition is not further improved, and instead leads to difficulty in blending.

In regard to colorants, the amount of colorant used is preferably equal to or less than about 300 parts by weight relative to 100 parts by weight of organopolysiloxane (A), in order to retain practical hardenability of the silicone composition.

A solvent may be added to the silicone composition in order to decrease viscosity of the admixture. Illustrative examples of preferred solvents are, for example, aromatic hydrocarbon solvents such as toluene, xylene and the like, and aliphatic hydrocarbon solvents such as hexane, octane and the like, both of which are suitable because of their compatibility with organopolysiloxane compounds.

EXAMPLES

Now, a few examples of the photo-curable silicone composition according to the present invention and one comparative example will be described. In the description of the examples, M, D, $D^{Vi}$, $D^{Ph}$, $T^{SH}$, $T^{Ph}$, $T^{Vi}$ and Q represent the following chemical formulae:

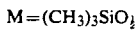
$M = (CH_3)_3 SiO_{\frac{1}{2}}$

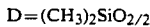
$D = (CH_3)_2 SiO_{2/2}$

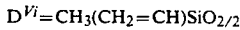
$D^{Vi} = CH_3(CH_2=CH)SiO_{2/2}$

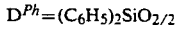
$D^{Ph} = (C_6H_5)_2 SiO_{2/2}$

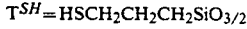
$T^{SH} = HSCH_2CH_2CH_2SiO_{3/2}$

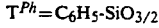
$T^{Ph} = C_6H_5\text{-}SiO_{3/2}$

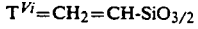
$T^{Vi} = CH_2=CH\text{-}SiO_{3/2}$

$Q = SiO_{4/2}$

EXAMPLE 1

First, 60 parts by weight of a dimetylvinylsilylterminated polymethylphenylsiloxane consisting essentially of 95 mole percent of dimethylsiloxy units (D) and 5 mole percent of diphenylsiloxy units ($D^{Ph}$) and having a viscosity of 1,000 centipoises at 25° C. was put into a flask and mixed with 80 parts by weight of a toluene solution containing 50 percent by weight of a polymethylvinylsiloxane represented by an average rational formula $M_6 D^{Vi} Q_8$ and having a melting point of 100° C. Next, the mixture was heated at a reduced pressure of 20 mmHg until the toluene was completely removed and the temperature of the mixture had reached 150° C. Then, 100 parts by weight of the residual mixture was added to a mixture previously prepared from 40 parts by weight of a mercaptopropyl-radical-containing polymethylsiloxane, having an average rational formula represented by $MT^{SH}_5 D_{60}$ and a viscosity of 200 centipoises at 25° C., 2 parts by weight of 2-hydroxy-2-methyl-1-phenylpropane-1-on and 0.5 part by weight of 2,4,6-trimethylbezoyl diphenyl phosphine oxide, thereby obtaining the silicone composition of Example 1.

Next, a glass plate having a dimensions of 50 mm×50 mm was coated with the silicone composition and covered with another glass plate having the same dimensions. The glass-coating composition was then exposed to the glow light of a 60-watt incandescent electric lamp at a distance of 5 cm from the lamp. At this time, the light intensity values were 0.200 mW/cm² at a wavelength of 420 nm and 0.001 mW/cm² at a wavelength of 365 nm. These light intensity values show that the incandescent lamp gave off visible light radiation at a wavelength of over 300 nm. After exposing the glass-coating composition for two minutes under this condition, the glass plates became fixed to one other, thereby establishing a silicone composition hardened by visible light radiation at a wavelength of over 300 nm. The integrated amount of light measured by an integrating photometer at this time as 24 mJ/cm² at a wavelength of 420 nm.

The above-obtained silicone composition was poured into a cup made of polystyrene and having a depth of 3 cm, and it was exposed to the above-described light radiation condition. When the integrated amount of light measured by an integrating photometer reached a value of 200 mJ/cm², the silicone composition had hardened to a depth of 12 mm.

In another experiment, the above-obtained silicone composition was poured into a mold having a dimensions of 15 cm×15 cm and a depth of 1 mm. The mold was set on a conveyer belt which moved at a transporting speed of 2 m/min and passed under a 80 W/cm high-pressure mercury vapour lamp radiating at a height of 10 cm from the conveyer belt. In passing through the light radiation, the silicone composition in the mold was cured to form a sheet having a thickness of 1 mm. This sheet was then measured for various properties using a method in accordance with Japan Industrial Standard (JIS) No. K6301 and was determined to have a hardness of 40, a tensile strength of 12 kgf/cm² and an elongation of 100%.

EXAMPLE 2

First, 100 parts by weight of a dimetylvinylsilylterminated polymethylvinylsiloxane, consisting essentially of 98 mole percent of dimethylsiloxy units (D) and 2 mole percent of methylvinylsiloxy units ($D^{Vi}$) and having a viscosity of 20,000 centipoises at 25° C., was placed in a universal kneader and mixed with 20 parts by weight of a trimethylsilyl-terminated mercaptopropyl-radical-containing polydimethylsiloxane, consisting essentially of 20 mole percent of methyl(3-mercaptopropyl)siloxy units with the rest being dimethylsiloxy units (D) and having a viscosity of 400 centipoises at 25° C., 1 part by weight of 2-hydroxy-2-methyl-1-(4-isopropylphenyl)propane-1-on and 0.15 part by weight of 2,4,6-trimethylbenzoyl diphenyl phosphine oxide. Next, 15 parts by weight of fumed silica having a specific surface of 200 m²/g and being surface-treated with a siloxane was added to the above-obtained mixture until it became dispersed uniformly by stirring. This composition was further milled with a three-roll mill to produce a uniform formulation. This formulation had a consistency of 250 with a ¼ cone in accordance with ASTM standards.

The formulation was put in a 50 ml beaker and placed in a bell jar in order to deaerate under reduced pressure. After deaeration, the formulation was left to stand outdoors in direct sunlight. After 10 minutes of sunlight exposure, the formulation had hardened into a rubber-like state to a depth of 18 mm.

In another experiment, the formulation was poured into a mold having dimensions of 15 cm×15 cm and a depth of 1 mm. The formulation in the mold was left to stand outdoors in direct sunlight, and 10 minutes later it had cured to form a sheet having a thickness of 1 mm. This sheet was then measured for various properties using a method in accordance with Japan Industrial Standard No. K6301 and was determined to have a hardness of 56, a tensile strength of 19 kgf/cm² and an elongation of 90%.

EXAMPLE 3

First, 100 parts by weight of a toluene solution containing 50 percent by weight of a vinyl-radical-containing polyphenylmethylsiloxane represented by an average rational formula $T^{ph}_4T^{Vi}D_4$ and having a melting range of 40° to 60° C., was mixed with 100 parts by weight of a toluene solution containing 50 percent by weight of a mercaptopropy-radical-containing polyphenylmethylsiloxane, represented by an average rational formula $T^{ph}_4T^{SH}D_2$ and having a melting range of 80° to 120° C., and 5 parts by weight of 2,4,6-trimethylbenzoyl diphenyl phosphine oxide. The obtained silicone mixture was a colorless and clear solution having a viscosity of 20 centipoises at 25° C.

Next, 2 ml of the above-obtained silicone solution was dropped on a silicon wafer having a diameter of 5 inches, after which the wafer was rotated at a speed of 500 rpm for 10 seconds, and then at a speed of 2,000 rpm for 2 minutes by a spinner, thereby coating the wafer with the silicone solution. Next, the wafer was heated on a hot plate at a temperature of 100° C. for one minute to volatilize the solvent completely. At this time, the silicone coating was measured to have a thickness of 3 μm. A half portion of the silicone-coated silicon wafer was shaded with an aluminum plate, and the other half was exposed to the glow light of a 60-watt incandescent electric lamp at a distance of 5 cm from the lamp. At this time, the light intensity values were 0.200 mW/cm² at a wavelength of 420 nm and 0.001 mW/cm² at a wavelength of 365 nm. The glow light exposure was continued for two minutes, and the integrated amount of light measured by an integrating photometer at this time was 24 mJ/cm² at a wavelength of 420 nm. Next, the silicon wafer was steeped in toluene for 10 minutes. Then the silicon wafer was removed from the toluene, only the half portion of silicone coating that was exposed to the glow light remained on the silicon wafer. After drying, the silicone coating was subjected to a pencil hardness test, the result of which was a 2B level.

EXAMPLE 4

First, 100 parts by weight of a trimetylsilylterminated polymethylvinylsiloxane, consisting essentially of 99.8 mole percent of dimethylsiloxy units (D) and 0.2 mole percent of methylvinylsiloxy units ($D^{Vi}$) and having an average polymerization degree of 6,000, and 4 parts by weight of a hydroxy-terminated polydimethylsiloxane, having a viscosity of 30 centipoises at 25° C., were placed in a dough mixer and mixed thoroughly. Then, 55 parts by weight of fumed silica divided into several portions, having a specific surface of 200 m²/g and being surface-treated with a siloxane, was added to the above-obtained mixture and dispersed uniformly by stirring. After being heated to a temperature of 150° C., the mixture was kneaded for 2 hours, thereby obtaining a base formulation. This formulation was applied to milling rolls in a mill and was blended with 3 parts by weight of a mercaptopropyl-radical-containing polydimethylsiloxane, represented by an average rational formula $T^{SH}_5D_{60}$ and having a viscosity of 2,000 centipoises at 25° C., 2 parts by weight of 2-hydroxy-2-methyl-1-phenylpropane-1-on and 0.4 part by weight of 2,4,6-trimethylbezoyl diphenyl phosphine oxide in order to prepare a sample composition. The sample composition had a William's plasticity of 300 at a temperature of 25° C. With this sample composition, a core wire having a diameter of 1 mm was coated to have an outside diameter of 3 mm, using an extruding machine. The coated wire was left to stand outdoors in direct sunlight for 1 hour, and, as a result, the coating composition had hardened completely.

In another experiment, the same sample composition was rolled with a calendering roll to prepare a sheet having a thickness of 1 mm. This sheet was left to stand outdoors in direct sunlight for 1 hour in conditions similar to those mentioned above, resulting in a cured sheet having a thickness of 1 mm. This cured sheet was then measured for various properties using a method in accordance with Japan Industrial Standard No. K6301, and was determined to have a hardness of 60, a tensile strength of 100 kgf/cm², an elongation of 400% and a tear strength (JIS B type) of 48 kgf/cm².

EXAMPLE 5

First, 100 parts by weight of the silicone composition of Example 1 and 50 parts by weight of acetylene black were placed in a universal kneader and stirred until uniformly dispersed. This composition was further milled with a three-roll mill to have a uniform formulation.

This formulation was coated on a aluminum plate having dimensions of 500 mm×150 mm and a thickness of 0.3 mm, using a roll coating applicator which is regulated to a coating thickness of 300 μm. Then, the coated aluminum plate was left to stand outdoors in direct sunlight for 4 hours in conditions similar to those mentioned above in order to have a coating cured in a rubbery condition. At this time, the coating had a thickness of 180 μm, and measurements revealed that this cured coating had a specific volume resistance of 30 Ω.cm.

EXAMPLE 6

First, 100 parts by weight of a dimethylvinylsilyl-terminated polymethylphenylsiloxane, consisting essentially of 95 mole percent of dimethylsiloxy units (D) and 5 mole percent of diphenylsiloxy units ($D^{Ph}$) and having a viscosity of 1,000 centipoises at 25° C., was mixed with 12 parts by weight of a mercaptopropyl-radical-containing polymethylsiloxane, having an average rational formula represented by $MT^{SH}_5D_{60}$ and a viscosity of 300 centipoises at 25° C., and a solution prepared from 0.01 part by weight of p-methoxphenol and 0.5 part by weight of toluene. To this mixture was further added a mixed solution of 2.0 parts by weight of 2-hydroxy-2-methylpropiophenone and 0.5 part by weight of 2,4,6-trimethylbezoyl diphenyl phosphine oxide. After uniform mixing, a base composition was obtained.

Next, 115 parts by weight of the above base composition was added with 1 part by weight of (3-methacryloxypropyl)trimethoxysilane for the hydrolyzable-radical-containing silicon compound, as shown in Table 1, and was mixed uniformly to obtain the composition of sample No. 1 in Table 1. In a similarly manner, by substituting the hydrolyzable-radical-containing silicon compound with other compounds shown in Table 1, respective silicone composition sample Nos. 2 to 5 were prepared.

On the other hand, composition sample No. 6, which contains no hydrolyzable-radical-containing silicon compound, and composition sample No. 7, which contains no 2,4,6-trimethylbenzoyl diphenyl phosphine oxide, were prepared for comparison in the same manner as shown in Table 1. In addition, 100 parts by weight of a trimethylsilyl-terminated organopolysiloxane, consisting essentially of 10 mole percent of methylvinylsiloxy units ($D^{vi}$) with the rest being dimethylsiloxy units (D) and having a viscosity of 3,000 centipoises at 25° C., was added to 2 parts by weight of 2-hydroxy-2-methylpropiophenone and 0.5 part by weight of triallyl isocyanurate and uniformly mixed, thereby obtaining another comparative composition, composition sample No. 8, which is also shown in Table 1.

Each of the above-obtained composition sample Nos. 1 to 8 was held at a composition thickness of 200 μm between a pair of glass plates each having dimensions of 25 mm×80 mm×2 mm in such a way that the glass plates overlap with each other over an area of 25 mm×20 mm. Each of the sample pieces of coupled glass plates with the sample compositions was exposed to the glow light of a 60-watt incandescent electric lamp at a distance of 5 cm from the lamp. At this time, the light intensity values were 0.200 mW/cm² at a wavelength of 420 nm and 0.001 mW/cm² at a wavelength of 365 nm. The glow light exposure was continued for ten minutes under these conditions, and the integrated amount of light measured by an integrating photometer at this time was 120 mJ/cm² at a wavelength of 420 nm. For each of the sample Nos. 1 to 6, the coupled glass plates were firmly fixed to each other by the composition, thus demonstrating that each of the silicone compositions were cured by visible light radiation. For example Nos. 7 and 8, each sample piece was exposed to the glow light for another hour under the same conditions as the above, but neither of them showed any hardening at all.

Each of the photo-exposed sample pieces obtained above was subjected to a shear adhesion test, the results of which are shown in Table 1.

Moreover, with respect to sample Nos. 1 to 5, each cured sample piece was subjected to a thermal cycle test, wherein the sample piece was cyclically cooled to −40° C. for 30 minutes and then heated to 80° C. for 30 minutes. This cycle was repeated 100 times. After the thermal cycle test, each sample piece was measured with respect to its crack initiation, adhesion strength under shear and cohesive failure rate, the results of which are shown in Table 2. In this description, a cohesive failure rate denotes a rate at which sample pieces are split apart by cohesive failure and not by joint failure under enough tensile force.

In another experiment, each of the photo-cured sample pieces was subjected to a humidity resistance test, wherein the sample piece was subjected to a temperature of 85° C. and a relative humidity of 95% for 1,000 hours. Each of the photo-cured sample pieces was also subjected to heat tests, in which all the sample pieces were subjected to a temperature of 150° C. for 24 hours, and 200° C. for 24 hours, respectively. The results of the humidity resistance test and the heat tests are shown in Table 2.

For an adhesion test, 0.5 g of the composition of sample No. 1 was applied to a glass plate having a dimensions of 50 mm×50 mm×1 mm, and covered with another glass plate having the same dimensions, while making sure to avoid trapping any air bubbles in the composition. The glass plates, with a spacer, were pressed so that the distance between the glass plates was held constant to make the adhesive composition form uniform layer having a thickness of 0.1 mm, thereby obtaining a sample piece. This sample piece was then exposed to the glow light of a 60-watt incandescent electric lamp at a distance of 5 cm from the lamp through a cover glass. The glow light exposure was continued until the adhesive composition hardened, and at this time the integrated amount of light was measured by an integrating photometer to be 50 mJ/cm² at a wavelength of 420 nm.

The above photo-cured sample piece was then subjected to mechanical peeling of the glass plates. The cohesive failure rate at this time was 100%. Moreover, using Japan Industrial Standard No. K6850, the composition of sample No. 1 had been formed into an adhesive composition layer having a thickness of 0.1 mm between glass plates having dimensions in accordance with Standard No. K6850 and 0.1 mm thick. For hardening, the adhesive composition layer was exposed to glow light under the same light radiation condition of 190 mJ/cm². The obtained photo-cured composition was then measured to have a shear adhesion strength of 2.8 kgf/cm² and a cohesive failure rate of 100%.

EXAMPLE 7

First, 60 parts by weight of a dimethylvinylsilyl-terminated polymethylvinylsiloxane, consisting essentially of the rest being dimethylsiloxy units (D) and having a viscosity of 3,000 centipoises at 25° C., and 40 parts by weight of polymethylvinylsiloxane represented by an average rational formula $M_{5.5}D^{Vi}Q_{12}$ and having a melting point of 100° C., were placed in a universal kneader and dispersed uniformly by stirring while being heated. After cooling, 15 parts by weight of fumed silica, having a specific surface of 200 m²/g and being surface-treated with a siloxane, was added to the mixture and uniformly dispersed therein. This mixture was kneaded while being heated at a temperature of 150° C. at a reduced pressure of 10 mmHg for 4 hours. The mixture was cooled and then 30 parts by weight of a trimethylsilyl-terminated mercaptopropyl-radical-containing organopolysiloxane, consisting of 20 mole percent of methyl (3-mercaptopropyl)siloxy units with the rest being dimethylsiloxy units (D) and having a viscosity of 400 centipoises at 25° C., was added and mixed uniformly therein. After that, to the obtained mixture was further added a solution which was prepared, in advance, from 2.5 parts by weight of 2-hydroxy-2-methyl- 1-phenylpropane-1-on for a photo-reaction initiator, 0.5 part by weight of 2,4,6-trimethylbezoyl diphenyl phosphine oxide, 0.1 part by weight of p-methoxy phenol and 0.05 part by weight of p-t-butylpyrocatechol as polymerization inhibitors, and 0.2 part by weight of tetrakis[3-(3,5-di-t-butyl-4-hydroxyphenyl) propionate] methane as an anti-oxidant, and mixed uniformly. To the above-obtained composition, 1.3 parts by weight of (3-metacryloxypropyl)trimethoxysilane, 1.3 parts by weight of (3-aminopropyl)trimethoxysilane and 0.5 parts by weight of tris(3-(trimethoxysilyl)propyl) isocyanurate were added and stirred in uniformly. This composition had a consistency of 230 with a ¼ cone in accordance with ASTM standards.

The above-obtained composition was divided into several portions, and each portion was held at a composition thickness of 5 mm between each pair of adherends, each adherend having dimensions of 10 mm×70 mm and a thickness of 2 mm, and being made of a material shown in Table 3, respectively. The adherends were placed so as to overlap with each other over an area of 10 mm×20 mm, thereby preparing a test piece. Each of the test pieces was left to stand outdoors for 4 hours, and were exposed to direct sunlight by being placed upright on a polytetrafluoroethylene sheet. After the exposure, all the compositions had hardened completely. Each of the photo-cured test pieces was then measured for adhesion strength under shear stress, and the results are shown in Table 3.

EXAMPLE 8

First, 100 parts by weight of a dimetylvinylsilyl-terminated organopolysiloxane, consisting essentially of 5 mole percent of methylvinylsiloxy units ($D^{vi}$), 30 mole percent of dimethylphenylsiloxy units and dimethylsiloxy units (D) and having a viscosity of 1,500 centipoises at 25° C., and 50 parts by weight of a toluene solution containing 50 percent by weight of an organopolysiloxane, represented by an average rational formula $T^{SH}T^{Ph}_3 D^{Ph}_2 D_4$ and having a melting range of 40° to 60° C., were placed in a flask and stirred while being heated at a reduced pressure of 10 mmHg, in order to thoroughly remove the toluene, until the temperature of the mixture finally reached a temperature of 160° C. The obtained composition was then mixed with 1.5 parts by weight of (3-methacryloxypropyl)trimethoxysilane, 1.0 part by weight of (3-aminopropyl)trimethoxysilane and 3 parts by weight of 2,4,6-trimethylbezoyl diphenyl phosphine oxide and heated at a temperature of 100° C. for 1 hour, thereby obtaining a clear composition.

In a similar manner to that in Example 6, the composition was subjected to an adhesion test using various base plates made of glass and the like, the results of which are shown in Table 4. In this test, a sample piece was exposed to visible light radiation through a cover glass.

EXAMPLE 9

First, 80 parts by weight of a dimethylvinylsilyl-terminated polymethylphenylsiloxane, consisting essentially of 95 mole percent of dimethylsiloxy units (D) and 5 mole percent of diphenylsiloxy units ($D^{Ph}$) and having a viscosity of 3,000 centipoises at 25° C., and 40 parts by weight of a toluene solution containing 50 percent by weight of polymethylvinylsiloxane, represented by an average rational formula $M_6 D^{Vi} Q_8$ and having a melting point of 100° C., were placed in a flask and stirred while being heated at a reduced pressure of 10 mmHg, in order to thoroughly remove the toluene. Next, 100 parts by weight of this mixture of vinyl-radical-containing polysiloxane was placed in a universal kneader and mixed with 10 parts by weight of fumed silica surface-treated with a siloxane and dispersed uniformly. Next, the mixture was kneaded while being heated at a temperature of 150° C. at a reduced pressure of 10 mmHg for 2 hours. After cooling, the mixture was first mixed with 30 parts by weight of a mercaptopropyl-radical-containing polysiloxane, 1.5 parts by weight of 2-hydroxy-2-methylpropiophenone and 0.5 part by weight of 2,4,6-trimethylbezoyl diphenyl phosphine oxide, and was then mixed with 2 parts by weight of (3-methacryloxypropyl)trimethoxysilane, 2 parts by weight of (3-aminopropyl)trimethoxysilane and 0.5 part by weight of tris(3-(trimethoxysilyl)propyl) isocyanurate until uniformly mixed. The resulting composition had a consistency of 260 with a ½ cone in accordance with ASTM standards. This composition was further dispersed with 2 parts by weight of rutile titanium dioxide using a three-roll mill, thereby producing a white-colored formulation.

In a similar manner to that in Example 6, the composition was held between glass plates to form a test piece, and was photo-cured. In this example, the test piece had a shear adhesion strength of 28 kgf/cm² and a cohesive failure rate of 100%.

COMPARATIVE EXAMPLE 1

The procedure of Example 1 was repeated except that 2,4,6-trimethylbenzoyl diphenyl phosphine oxide was not employed in order to obtain a glass-coating composition that could be compared with Example 1.

In the same manner as in Example 1, the glass-coating composition was exposed to glow light for thirty minutes. However, the glass-coating composition remained in a liquid state, thereby demonstrating that without 2,4,6-trimethylbenzoyl diphenylphosphine oxide the glass-coating composition would be left uncured by visible light.

As is clearly shown in the above examples and the comparative example, according to the combination of an organopolysiloxane having a silicon-bonded unsaturated aliphatic radical, an organopolysiloxane having a silicon-bonded mercaptoalkyl radical and an arylcarbonyl compound as a photoreaction initiator, the silicone composition of the present invention can be easily cured by short-term exposure to visible light radiation, and can therefore be utilized efficiently as a photo-cured adhesive composition.

Besides, a silicone composition comprising a vinyl-radical-containing organopolysiloxane, a mercapto-radical-containing organopolysiloxane, either a hydrolyzable-radical-containing silicon compound or an alkenyl isocyanurate or its derivative and a photo-reaction initiator such as a benzophenone can be cured by radiation in the ultraviolet range, though it is not cured by visible light radiation.

As many apparently widely different embodiments of the present invention may be made without departing from the spirit and scope thereof, it is to be understood that the invention is not limited to the specific embodiments thereof, except as defined in the appended claims.

TABLE 1

| Ingredients | Sample No. 1 | 2 | 3 | 4 | 5 | 6 | 7 | 8 |
|---|---|---|---|---|---|---|---|---|
| polymethylphenylvinylsiloxane | 100 | 100 | 100 | 100 | 100 | 100 | 100 | 100 |
| mercaptopropyl-radical-containing polymethylvinylsiloxane | 12 | 12 | 12 | 12 | 12 | 12 | 12 | — |
| (3-methacryloxypropyl)trimethoxysilane | 1 | — | — | — | — | — | — | — |
| (3-aminopropyl)triethoxysilane | — | 1 | — | — | — | — | — | — |
| vinyltrimethoxysilane | — | — | 1 | — | — | — | — | — |
| (3-mercaptopropyl)trimethoxysilane | — | — | — | 1 | — | — | — | — |
| 3-(trimethoxysilyl)propyl diallyl isocyanurate | — | — | — | — | 1 | — | — | 0.5 |
| 2-hydroxy-2-methylpropiophenone | 2.0 | 2.0 | 2.0 | 2.0 | 2.0 | 2.0 | 2.0 | 2.0 |
| 2,4,6-trimethylbenzoyl diphenyl phosphine oxide | 0.5 | 0.5 | 0.5 | 0.5 | 0.5 | 0.5 | — | — |
| Adhesiveness — Cohesive Failure Rate (%) | 100 | 80[2] | 100 | 80[2] | 100 | 0 | not cured | not cured |
| Adhesiveness — Shear Adhesion Strength (kgf/cm$^2$) | 3.0 | 2.5 | 2.8 | 2.9 | 2.4 | —[1] | | |

Notes
[1] The sample peeled off when being set on the holder of the tester, thus no measurable data could be obtained.
[2] After one day, both samples were re-measured to have a value of 100%, respectively.

TABLE 2

| | | Sample No. 1 | 2 | 3 | 4 | 5 |
|---|---|---|---|---|---|---|
| Thermal Cycling Test | Cracking | no | no | no | no | no |
| | Shear Adhesion Strength (kgf/cm$^2$) | 2.6 | 2.9 | 3.2 | 2.7 | 2.8 |
| | Cohesive Failure Rate (%) | 100 | 100 | 100 | 100 | 100 |
| Humidity Resistance Test | Cracking | no | no | no | no | no |
| | Shear Adhesion Strength (kgf/cm$^2$) | 2.9 | 2.6 | 3.0 | 3.2 | 2.9 |
| | Cohesive Failure Rate (%) | 100 | 100 | 100 | 100 | 100 |
| Heat Test at 150° C. for 24 hrs | Cracking | no | no | no | no | no |
| | Shear Adhesion Strength (kgf/cm$^2$) | 3.2 | 3.4 | 3.1 | 3.0 | 2.6 |
| | Cohesive Failure Rate (%) | 100 | 100 | 100 | 100 | 100 |
| at 200° C. for 24 hrs | Cracking | no | no | no | no | no |
| | Shear Adhesion Strength (kgf/cm$^2$) | 3.8 | 3.8 | 3.0 | 2.8 | 3.8 |
| | Cohesive Failure Rate (%) | 100 | 100 | 100 | 100 | 100 |

TABLE 3

| Adherend Materials | Adhesiveness — Shear Adhesion Strength (kgf/cm$^2$) | Cohesive Failure Rate[*] |
|---|---|---|
| Glass | 18 | A |
| Aluminum | 15 | A |
| Brass | 13 | A |
| Stainless Steel (SUS 304 of JIS) | 14 | A |
| Cold Rolled Steel (in JIS G3141) | 15 | A |
| Copper | 17 | A |
| ABS Resin | 13 | B |
| Unsaturated Polyester/Glass | 16 | A |
| Epoxy Resin/Glass | 20 | A |
| Phenol Resin | 13 | A |
| Polycarbonate | 14 | A |

Note:
[*] Mark A indicates that the cohesive failure rate was 100%.
Mark B indicates that the cohesive failure rate was between 80% and 100%.

TABLE 4

| Plate Materials Adhered to Glass Plate | Adhesiveness — Shear Adhesion Strength (kgf/cm$^2$) | Cohesive Failure Rate (%) |
|---|---|---|
| Glass | 3.2 | 100 |
| Aluminum | 2.3 | 100 |
| Brass | 2.1 | 80 |
| Stainless Steel (SUS 304 of JIS) | 2.6 | 100 |
| Copper | 3.0 | 100 |
| Nickel | 2.3 | 80 |
| ABS Resin | 2.4 | 80 |
| Epoxy Resin | 3.4 | 100 |
| Unsaturated Polyester/Glass (20% Glass Fiber) | 3.0 | 100 |
| Phenol Resin | 2.7 | 100 |
| Polycarbonate | 2.6 | 100 |
| PBT resin/Glass (20% Glass Fiber) | 2.4 | 100 |

What is claimed is:

1. A curable silicone composition comprising:
   (A) an organopolysiloxane having a silicon-bonded unsaturated aliphatic radical;
   (B) an organopolysiloxane having a silicon-bonded mercaptoalkyl radical; and
   (C) a photoreaction-initiating amount of photoreaction initiator represented by the formula:

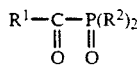

wherein $R^1$ is selected from the group consisting of substituted and unsubstituted aryl radicals, and each $R^2$ is individually selected from the group consisting of substituted and unsubstituted monovalent hydrocarbon radicals.

2. The curable silicone composition of claim 1, wherein the silicon-bonded unsaturated aliphatic radical of the organopolysiloxane (A) is selected from the group consisting of vinyl, propenyl, butenyl, hexenyl, cyclohexenyl, cyclooctenyl, cyclohexenylethyl, cyclooctenylethyl, ethynyl, propynyl, butynyl and hexynyl.

3 The curable silicone composition of claim 1, wherein the organopolysiloxane (B) having the silicon-bonded mercaptoalkyl radical is present at an amount of 1 to 200 parts by weight relative to 100 parts by weight of the organopolysiloxane (A) having the silicon-bonded unsaturated aliphatic radical.

4. The curable silicone composition of claim 1, wherein the silicon-bonded mercaptoalkyl radical of the organopolysiloxane (B) is selected from the group consisting of mercaptomethyl, mercaptoethyl, mercaptopropyl and mercaptobutyl.

5. The curable silicone composition of claim 1, wherein the photoreaction initiator (C) is present at an amount of 0.05 to 50 parts by weight relative to 100 parts by weight of the organopolysiloxane (A) having the silicon-bonded unsaturated aliphatic radical.

6. The curable silicone composition of claim 1, wherein the radical $R^1$ is a 2,4,6-trimethylphenyl radical.

7. The curable silicone composition of claim 1, wherein the radical $R^2$ is a phenyl radical.

8. The curable silicone composition of claim 1, further comprising:
a silicon compound (D) having a hydrolyzable radical.

9. The curable silicone composition of claim 8, wherein the hydrolyzable radical of the silicon compound (D) is selected from the group consisting of methoxy, ethoxy, propoxy, 2-propenyloxy, phenoxy, acetoxy, methyl ethyl ketoximo, diethylamino, acetylamino, diethylaminoxy, and their halogenated or cyanogenated derivatives, fluoro, chloro, bromo, iodo and a hydroxyl radical.

10. The curable silicone composition of claim 8, wherein the silicon compound (D) is present at an amount of 0.1 to 20 parts by weight relative to 100 parts by weight of the organopolysiloxane (A) having the silicon-bonded unsaturated aliphatic radical.

11. The curable silicone composition of claim 1, wherein the organopolysiloxane (A) having the silicon-bonded unsaturated aliphatic radical has a viscosity of 50 to 500,000 centipoises.

12. The silicone composition of claim 1, further comprising an effective amount of an anti-gelling agent.

13. The silicone composition of claim 1, further comprising an effective amount of a heat resistance improver.

14. The silicone composition of claim 1, further comprising an effective amount of a filler.

15. The silicone composition of claim 1, further comprising an effective amount of a colorant.

16. The silicone composition of claim 1, further comprising a solvent.

* * * * *